(12) United States Patent
Alshehri et al.

(10) Patent No.: US 12,553,768 B2
(45) Date of Patent: Feb. 17, 2026

(54) NANOMATERIAL PLASTIC OPTICAL FIBER FOR PIPELINE NERVE SYSTEM

(71) Applicant: Saudi Arabian Oil Company, Dhahran (SA)

(72) Inventors: Ali Alshehri, Thuwal (SA); Nada Alruwaii, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 309 days.

(21) Appl. No.: 18/188,225

(22) Filed: Mar. 22, 2023

(65) Prior Publication Data

US 2024/0319002 A1  Sep. 26, 2024

(51) Int. Cl.
*G01H 9/00* (2006.01)
*F17D 5/02* (2006.01)
*G01D 5/353* (2006.01)

(52) U.S. Cl.
CPC .............. *G01H 9/004* (2013.01); *F17D 5/02* (2013.01); *G01D 5/35316* (2013.01)

(58) Field of Classification Search
CPC .......... G01H 9/004; G01H 9/006; G01H 9/00; G01H 17/00; G01H 11/06; G01H 3/04; G01H 3/08; G01H 5/00; G01H 9/002; G01H 9/008; F17D 5/06; F17D 5/02; F17D 5/005; F17D 5/00; F17D 3/01; F17D 1/02; F17D 1/04; F17D 1/08; F17D 1/005; F17D 3/18; F17D 5/04; F17D 1/07; F17D 3/14; F17D 1/17; F17D 3/08; F17D 3/12; F17D 3/00; G01K 11/32; G01K 11/3206; G01K 11/324; G01K 11/322; G01K 15/005; G01K 7/02; G01K 1/14; G01K 1/143; G01K 11/006; G01K 15/007; G01K 17/00; G01K 3/005; G01K 1/00; G01K 1/024; G01K 1/12; G01K 1/20; G01K 11/24; G01K 13/00; G01K 13/02; G01K 13/024; G01K 2203/00; G01K 2215/00; G01K 3/10; G01K 7/22; G01K 21/02; G01D 5/35361;
(Continued)

(56) References Cited

U.S. PATENT DOCUMENTS 11,635,157 B2 *  4/2023  Xu ..................... B32B 27/32
                                                  138/125
2022/0349732 A1  11/2022  Shehri et al.

FOREIGN PATENT DOCUMENTS

WO      2010117277 A1   10/2010

OTHER PUBLICATIONS

Vitoria, I. et al. Fiber optic gas sensors based on lossy mode resonances and sensing materials used therefor: A comprehensive review. Sensors (Basel, Switzerland). (2021).
(Continued)

*Primary Examiner* — John Bedtelyon
(74) *Attorney, Agent, or Firm* — Leason Ellis LLP (57) ABSTRACT

A pipe segment for use in construction of a pipeline comprising a pipe body and a sensing nerve network that is embedded in or coupled to the pipe body and is configured to monitor a condition of the pipe segment in real-time. The sensing nerve network comprises plastic optical fiber (POF) nerves and a nanomaterial coating covering a span of the plastic optical fiber nerves, the coating having an approximately constant diameter and the nanomaterial having a property that changes in the presence of a targeted gas, enabling detection of the targeted gas along the length of the optical fiber nerves.

20 Claims, 3 Drawing Sheets

(58) Field of Classification Search
CPC ............. G01D 5/353; G01D 5/35316; G01D 5/35306; G01D 5/35364; G01D 5/35358; G01D 5/3537; G01D 5/35383; G01D 5/35374; G01D 5/268; G01D 5/35354; G01D 5/35303; G01D 5/35325; G01D 5/35329; G01D 5/3538; G01D 5/35387; G01D 5/48; G01D 5/35338; G01D 5/35348; G01D 5/35312; G01D 5/35377; G01D 5/35335; G01D 5/35396; G01D 5/36; G01D 5/35345; G01D 11/00; G01D 5/35341; G01D 5/35393; G01D 18/00; G01D 3/028; G01D 3/036; G01D 5/35322; G01D 5/35332; G01D 11/16; G01D 5/264; G01D 5/38; G01D 11/24; G01D 11/245; G01D 18/008; G01D 2204/24; G01D 3/032; G01D 4/004; G01D 5/26; G01D 5/344; G01D 5/3539; G01D 5/54; G01N 21/01; G01N 21/3504; G01N 21/39; G01N 21/31; G01N 21/65; G01N 2021/0112; G01N 21/718; G01N 21/85; G01N 21/45; G01N 21/33; G01N 1/24; G01N 2203/0019; G01N 1/2205; G01N 21/0303; G01N 21/658; G01N 1/28; G01N 21/359; G01N 30/02; G01N 15/06; G01N 21/8507; G01N 3/12; G01N 21/17; G01N 1/44; G01N 21/15; G01N 1/2258; G01N 15/075; G01N 21/84; G01N 3/02; G01N 3/08; G01N 33/00; G01N 33/24; G01N 21/25; G01N 21/88; G01N 2201/06113; G01N 2201/088; G01N 17/006; G01N 2203/0048; G01N 30/06; G01N 21/41; G01N 2203/0682; G01N 1/34; G01N 2021/458; G01N 17/00; G01N 2201/08; G01N 25/00; G01N 2021/1704; G01N 2021/8405; G01N 21/1702; G01N 21/21; G01N 21/63; G01N 2203/0003; G01N 25/20; G01N 25/54; G01N 27/223; G01N 29/14; G01N 33/0004; G01N 1/22; G01N 15/0826; G01N 2015/1006; G01N 2021/8578; G01N 21/3103; G01N 21/7703; G01N 21/954; G01N 2203/0226; G01N 2203/0256; G01N 2203/0676; G01N 3/068; G01N 31/12; G01N 33/00036; G01N 1/2247; G01N 1/405; G01N 2021/394; G01N 2021/451; G01N 21/03; G01N 21/255; G01N 21/6402; G01N 21/8851; G01N 2203/0044; G01N 2203/0066; G01N 2203/0075; G01N 25/72; G01N 27/041; G01N 29/04; G01N 3/06; G01N 33/0031; G01N 33/0073; G01N 33/18; G01N 1/2202; G01N 1/2214; G01N 1/2273; G01N 1/4044; G01N 15/0618; G01N 15/10; G01N 2021/151; G01N 2021/391; G01N 2021/4173; G01N 2021/6432; G01N 21/3518; G01N 21/33577; G01N 21/474; G01N 21/55; G01N 21/59; G01N 21/643; G01N 21/67; G01N 2203/0067; G01N 2203/0641; G01N 2291/044; G01N 25/22; G01N 27/06; G01N 27/62; G01N 29/00; G01N 29/0654; G01N 29/262; G01N 33/0016; G01N 33/0061; G01N 33/225; G01N 1/38; G01N 1/40; G01N 15/08; G01N 15/082; G01N 17/04; G01N 2001/2282; G01N 2021/1793; G01N 2021/1797; G01N 2021/7709; G01N 21/031; G01N 21/27; G01N 21/6428; G01N 21/73; G01N 21/78; G01N 21/783; G01N 21/8806; G01N 21/94; G01N 2201/021; G01N 2201/1296; G01N 2203/0228; G01N 2203/0232; G01N 2203/0236; G01N 2291/0224; G01N 3/36; G01N 3/54; G01N 30/08; G01N 31/22; G01N 33/0018; G01N 33/004; G01N 33/0047; G01N 33/007; G01N 33/222; G01N 5/04; G01N 9/00; G01N 1/04; G01N 1/14; G01N 1/286; G01N 1/36; G01N 1/4077; G01N 13/00; G01N 13/02; G01N 15/02; G01N 15/0205; G01N 15/0211; G01N 15/04; G01N 15/0806; G01N 17/002; G01N 19/04; G01N 2015/084; G01N 2021/1795; G01N 2021/218; G01N 2021/3515; G01N 2021/3595; G01N 2021/8466; G01N 2021/9542; G01N 2035/00356; G01N 21/00; G01N 21/05; G01N 21/211; G01N 21/274; G01N 21/314; G01N 21/3581; G01N 21/49; G01N 21/645; G01N 21/8915; G01N 21/95; G01N 21/952; G01N 2201/0221; G01N 2201/0636; G01N 2201/084; G01N 2201/0873; G01N 2201/129; G01N 2203/006; G01N 2203/0073; G01N 2203/0222; G01N 2203/024; G01N 2203/00252; G01N 2291/021; G01N 2291/0234; G01N 23/046; G01N 29/024; G01N 29/036; G01N 29/11; G01N 29/326; G01N 29/46; G01N 3/18; G01N 3/20; G01N 33/0009; G01N 33/1813; G01N 33/365; G01N 5/02; G01N 15/088; G01N 15/1031; G01N 15/1433; G01N 15/1434; G01N 2001/2217; G01N 2001/225; G01N 2001/2261; G01N 2001/2264; G01N 2001/227; G01N 2001/2866; G01N 2001/4088; G01N 2013/003; G01N 2021/152; G01N 2021/3148; G01N 2021/396; G01N 2021/399; G01N 2021/638; G01N 2021/6484; G01N 2021/7713; G01N 2021/7716; G01N 2021/7723; G01N 2021/773; G01N 2021/7776; G01N 2021/7786; G01N 2021/8455; G01N 2021/8883; G01N 2021/8887; G01N 2021/9546; G01N 2030/025; G01N 2030/062; G01N 2030/146; G01N 21/0332; G01N 21/09; G01N 21/3151; G01N 21/35; G01N 21/3563; G01N 21/412; G01N 21/47; G01N 21/538; G01N 21/552; G01N 21/636; G01N 21/71; G01N 21/72; G01N 21/76; G01N 2201/0638; G01N 2201/0826; G01N 2201/0833; G01N 2201/0886; G01N 2203/0005; G01N 2203/0017; G01N 2203/0023; G01N 2203/0033; G01N 2203/0051; G01N 2203/0064; G01N 2203/0078; G01N 2203/0082; G01N 2203/0224; G01N 2203/0238; G01N 2203/0254; G01N 2203/0266; G01N 2203/0617; G01N 2203/0647; G01N 2223/04; G01N
2223/07; G01N 2223/102; G01N
2223/31; G01N 2291/014; G01N
2291/0217; G01N 2291/0222; G01N
2291/02836; G01N 2291/02845; G01N
2291/02872; G01N 2291/0289; G01N
2291/106; G01N 23/06; G01N 23/20;
G01N 23/22; G01N 23/2202; G01N
23/2204; G01N 23/2251; G01N 25/14;
G01N 27/12; G01N 27/27; G01N
27/4162; G01N 27/4167; G01N 27/4168;
G01N 27/623; G01N 27/626; G01N
27/85; G01N 27/9093; G01N 29/02;
G01N 29/42; G01N 29/44; G01N 3/00;
G01N 3/04; G01N 3/30; G01N 30/14;
G01N 30/72; G01N 30/74; G01N 30/88;
G01N 31/10; G01N 33/1806; G01N
33/1826; G01N 33/1833; G01N 33/362;
G01N 33/383; G01N 33/442; G01N
33/535; G01N 33/543; G01N 33/56983;
G01N 35/00; G01N 7/00; G01N 7/16;
G01N 1/08; G01N 1/10; G01N 1/2211;
G01N 1/2252; G01N 1/30; G01N 1/4005;
G01N 1/4022; G01N 1/42; G01N 11/06;
G01N 11/162; G01N 15/0625; G01N
15/1468; G01N 17/008; G01N 17/02;
G01N 2001/2223; G01N 2001/2238;
G01N 2001/2244; G01N 2001/2255;
G01N 2001/2267; G01N 2001/302; G01N
2001/366; G01N 2001/4033; G01N
2001/4083; G01N 2013/0216; G01N
2015/0681; G01N 2015/086; G01N
2015/1445; G01N 2015/1447; G01N
2015/1452; G01N 2015/1454; G01N
2015/1486; G01N 2015/1493; G01N
2015/1495; G01N 2015/1497; G01N
2021/0106; G01N 2021/0162; G01N
2021/0378; G01N 2021/158; G01N
2021/3155; G01N 2021/3545; G01N
2021/4709; G01N 2021/4742; G01N
2021/6439; G01N 2021/775; G01N
2021/7763; G01N 2021/7783; G01N
2021/8592; G01N 2021/8848; G01N
2021/8925; G01N 2030/085; G01N
2030/3069; G01N 2030/77; G01N
2030/884; G01N 2035/0463; G01N
21/3586; G01N 21/4133; G01N 21/51;
G01N 21/532; G01N 21/554; G01N
21/61; G01N 21/62; G01N 21/6458;
G01N 21/69; G01N 21/77; G01N
21/8903; G01N 21/892; G01N 22/02;
G01N 2201/0214; G01N 2201/0231;
G01N 2201/0853; G01N 2201/12; G01N
2201/1222; G01N 2203/001; G01N
2203/0026; G01N 2203/0032; G01N
2203/0202; G01N 2203/023; G01N
2203/0234; G01N 2203/0246; G01N
2203/025; G01N 2203/0258; G01N
2203/0274; G01N 2291/0232; G01N
2291/0235; G01N 2291/02425; G01N
2291/02433; G01N 2291/0257; G01N
2291/0258; G01N 2291/02809; G01N
2291/0427; G01N 2291/2634; G01N
25/04; G01N 25/16; G01N 25/32; G01N
25/46; G01N 25/68; G01N 27/125; G01N
27/127; G01N 27/20; G01N 27/26; G01N
27/416; G01N 27/72; G01N 27/87; G01N
29/022; G01N 29/069; G01N 29/07;
G01N 29/12; G01N 29/225; G01N
29/2418; G01N 29/34; G01N 29/348;
G01N 29/36; G01N 29/4418; G01N
29/4454; G01N 29/4463; G01N 3/307;
G01N 3/313; G01N 3/32; G01N 3/56;
G01N 30/20; G01N 30/30; G01N
30/6052; G01N 30/606; G01N 30/6078;
G01N 30/6091; G01N 30/66; G01N
30/68; G01N 30/78; G01N 30/8624;
G01N 30/96; G01N 33/0022; G01N
33/0032; G01N 33/0037; G01N 33/0044;
G01N 33/0045; G01N 33/005; G01N
33/0093; G01N 33/0098; G01N 33/12;
G01N 33/2025; G01N 33/22; G01N
33/28; G01N 33/367; G01N 33/386;
G01N 33/497; G01N 33/4975; G01N
33/5044; G01N 33/5304; G01N
33/54313; G01N 33/00732; G01N
35/0099; G01N 35/10; G01N 5/00; G01N
7/04; G01N 9/24; G01M 3/243; G01M
3/047; G01M 3/38; G01M 3/002; G01M
3/04; G01M 5/0091; G01M 11/085;
G01M 5/0025; G01M 3/18; G01M 11/30;
G01M 3/00; G01M 3/24; G01M 3/2815;
G01M 11/083; G01M 5/0058; G01M
11/3109; G01M 3/2892; G01M 11/086;
G01M 11/331; G01M 99/008; G01M
13/00; G01M 3/02; G01M 5/0008; G01M
3/007; G01M 3/26; G01M 3/2807; G01M
7/025; G01M 11/3154; G01M 11/39;
G01M 3/246; G01M 5/0066; G01M
11/00; G01M 5/0033; G01M 99/002;
G01M 10/00; G01M 3/144; G01M 3/22;
G01M 3/222; G01M 3/3236; G01M
11/088; G01M 11/31; G01M 11/327;
G01M 11/334; G01M 15/04; G01M 3/10;
G01M 3/182; G01M 3/40; G01M 5/0041;
G01M 7/00; G01M 11/02; G01M
11/0228; G01M 11/3118; G01M 11/317;
G01M 11/3172; G01M 15/02; G01M
15/102; G01M 3/005; G01M 3/06; G01M
3/16; G01M 3/2876; G01M 3/32; G01M
3/3272; G01M 3/329; G01M 5/00; G01M
7/02; G01M 99/00; G01M 99/005; G01M
11/0207; G01M 11/3163; G01M 11/319;
G01M 11/33; G01M 15/108; G01M
17/007; G01M 17/0078; G01M 17/08;
G01M 3/085; G01M 3/086; G01M 3/14;
G01M 3/143; G01M 3/165; G01M 3/20;
G01M 3/202; G01M 3/205; G01M 3/223;
G01M 3/226; G01M 3/28; G01M 3/2823;
G01M 3/34; G01M 3/36; G01M 7/08;
G01M 9/00; G01M 9/06; E21B 47/135;
E21B 47/00; E21B 47/06; E21B 47/07;
E21B 47/107; E21B 43/26; E21B 49/00;
E21B 47/117; E21B 17/206; E21B 36/04;
E21B 47/14; E21B 17/01; E21B 2200/20;
E21B 43/00; E21B 2200/22; E21B
43/267; E21B 47/10; E21B 47/12; E21B
7/14; E21B 43/01; E21B 37/00; E21B
37/06; E21B 43/11; E21B 47/002; E21B
33/13; E21B 43/12; E21B 43/24; E21B 47/0025; E21B 47/113; E21B 43/119; E21B 17/10; E21B 33/12; E21B 43/006; E21B 43/34; E21B 47/09; E21B 49/08; E21B 7/04; E21B 17/00; E21B 17/042; E21B 17/1078; E21B 21/00; E21B 23/001; E21B 23/14; E21B 33/06; E21B 43/086; E21B 43/121; E21B 43/16; E21B 43/164; E21B 43/2401; E21B 43/36; E21B 43/38; E21B 47/095; E21B 49/088; E21B 7/00; E21B 7/15; E21B 21/01; E21B 21/16; E21B 31/005; E21B 31/03; E21B 36/00; E21B 36/008; E21B 41/005; E21B 41/0099; E21B 43/122; E21B 43/20; E21B 43/2405; E21B 43/241; E21B 43/29; E21B 43/305; E21B 43/40; E21B 47/005; E21B 47/017; E21B 47/0224; E21B 47/0228; E21B 47/103; E21B 49/008; E21B 49/02; E21B 49/081; E21B 49/0875; E21B 7/20; E21B 10/42; E21B 10/602; E21B 12/00; E21B 17/015; E21B 17/017; E21B 17/026; E21B 17/08; E21B 17/18; E21B 23/00; E21B 23/04; E21B 23/08; E21B 23/10; E21B 28/00; E21B 33/14; E21B 34/02; E21B 34/06; E21B 34/08; E21B 36/02; E21B 41/0085; E21B 43/017; E21B 43/123; E21B 43/124; E21B 43/14; E21B 43/166; E21B 43/168; E21B 43/2605; E21B 43/295; E21B 43/35; E21B 44/00; E21B 47/001; E21B 47/007; E21B 47/02; E21B 47/022; E21B 47/13; E21B 49/003; E21B 49/084; E21B 49/087; E21B 49/10; E21B 7/06; E21B 7/061; E21B 7/064; E21B 7/068; E21B 7/18; G01L 1/242; G01L 11/025; G01L 1/246; G01L 1/247; G01L 11/02; G01L 1/245; G01L 11/00; G01L 5/00; G01L 7/086; G01L 19/0092; G01L 19/04; G01L 19/141; G01L 27/005; G01L 5/0057; G01L 5/166; G01L 9/0032; G01L 1/00; G01L 1/24; G01L 1/243; G01L 1/26; G01L 11/06; G01L 13/025; G01L 19/00; G01L 19/0038; G01L 19/0654; G01L 19/086; G01L 2019/0053; G01L 27/002; G01L 5/0038; G01L 5/0052; G01L 5/167; G01B 11/16; G01B 11/18; G01B 11/165; G01B 11/161; G01B 11/00; G01B 11/02; G01B 9/02015; G01B 9/02; G01B 9/02003; G01B 9/02056; G01B 11/06; G01B 11/0625; G01B 11/0683; G01B 17/00; G01B 11/2441; G01B 21/085; G01B 9/02041; G01B 9/02059; G01B 15/00; G01B 21/16; G01B 21/20; G01B 21/32; G01B 5/201; G01B 11/08; G01B 11/168; G01B 11/24; G01B 13/10; G01B 15/06; G01B 7/02; G01B 17/04; G01B 21/00; G01B 21/02; G01B 5/00; G01B 5/0002; G01B 5/0004; G01B 5/28; G01B 7/16; G01B 7/18; G01B 9/02027; G01B 9/0209; G01F 1/661; G01F 1/662; G01F 23/292; G01F 1/666; G01F 1/28; G01F 23/2928; G01F 1/7086; G01F 1/66; G01F 1/667; G01F 1/42; G01F 1/76; G01F 15/005; G01F 1/6884; G01F 15/061; G01F 1/688; G01F 1/86; G01F 15/00; G01F 23/164; G01F 25/10; G01F 1/20; G01F 1/684; G01F 1/712; G01F 1/8427; G01F 1/8477; G01F 1/849; G01F 15/001; G01F 15/10; G01F 15/14; G01F 23/00; G01F 9/00; G02B 6/02395; G02B 6/02085; G02B 6/52; G02B 6/443; G02B 6/02; G02B 6/02042; G02B 6/4407; G02B 6/4433; G02B 6/441; G02B 6/4415; G02B 6/502; G02B 6/506; G02B 5/02033; G02B 6/0281; G02B 6/4432; G02B 6/4459; G02B 6/4479; G02B 1/048; G02B 6/02076; G02B 6/0365; G02B 6/50; G02B 6/508; G02B 6/02104; G02B 6/036; G02B 6/02123; G02B 6/02328; G02B 6/03627; G02B 6/03633; G02B 6/03644; G02B 6/4436; G02B 6/02009; G02B 6/021; G02B 6/02347; G02B 6/024; G02B 6/44; G02B 6/4427; G02B 2006/12138; G02B 27/00; G02B 27/0006; G02B 27/283; G02B 6/02209; G02B 6/0229; G02B 6/02309; G02B 6/0285; G02B 6/00286; G02B 6/03694; G02B 6/25; G02B 6/2551; G02B 6/262; G02B 6/2843; G02B 6/2861; G02B 6/4202; G02B 6/43; G02B 6/4401; G02B 6/4429; G02B 6/44384; G02B 6/4486; G02B 6/46; G02B 6/54; G02B 1/005; G02B 1/02; G02B 1/04; G02B 1/041; G02B 1/11; G02B 1/14; G02B 2006/02161; G02B 27/022; G02B 27/028; G02B 6/00; G02B 6/02014; G02B 6/02019; G02B 6/02047; G02B 6/02114; G02B 6/02128; G02B 6/02138; G02B 6/0218; G02B 6/02304; G02B 6/02314; G02B 6/02338; G02B 6/02371; G02B 6/03638; G02B 6/03655; G02B 6/12009; G02B 6/245; G02B 6/255; G02B 6/2558; G02B 6/2746; G02B 6/29352; G02B 6/3612; G02B 6/3636; G02B 6/3652; G02B 6/368; G02B 6/3684; G02B 6/3839; G02B 6/4296; G02B 6/44386; G02B 6/4439; G02B 6/4444; G02B 6/4454; G02B 7/007; G02B 2006/0325; G02B 2006/12192; G02B 2006/12195; G02B 21/32; G02B 21/365; G02B 6/02004; G02B 6/02147; G02B 6/02152; G02B 6/02342; G02B 6/032; G02B 6/1225; G02B 6/2552; G02B 6/2553; G02B 6/26; G02B 6/264; G02B 6/322; G02B 6/3616; G02B 6/3807; G02B 6/4204; G02B 6/4298; G02B 6/4405; G02B 6/4416; G02B 6/4434; G02B 6/44382; G02B 6/4446; G02B 6/4452; G02B 6/4472; G02B 6/4482; G02B 6/4488; G02B 7/00; G02B 7/02

See application file for complete search history.

(56) References Cited

OTHER PUBLICATIONS

Aitor Urrutia et al.; Review Article; Optical Fiber Sensorrs Based on nanopartivle-Embedded Coatings; Hindawi Publishing Corporatio, Journal of Sensors, vol. 2015, Article ID 805053.

(56) References Cited

OTHER PUBLICATIONS

Lopez, J. D., Keley, M., Dante, A., & Werneck, M. M. (Oct. 25, 2021). Optical fiber sensor coated with copper and ron oxide nanoparticles for hydrogen sulfide sensing. Optical Fiber Technology.

Jingwen Feng, et al.; LSPR optical fiber sensor based on 3D gold nanoparticles with monolayer graphene as a spacer; Optics Express vol. 30, No. 6; Mar. 14, 2022.

Renganathan, B., et al.; (Dec. 17, 2013). Fiber optic gas sensor with nanocrystalline zno. Optical Fiber Technology.

W. Jin et al.; Gas detection with micro- and nano-engineered optical fibers; Deparment of Electrical Engineering and Shenzhen Research Institute, The Hong Kong Polytechnic University, Hong Kong, China; Available online Sep. 19, 2013.

Pedro C. Lallana et al.; Sensing Applications in Aircrafts Using Polymer Optical Fibres; https://doi.org/10.3390/s21113605; Published May 21, 2021.

Yap at al.; Carbon Allotrope-Based Optical Fibres for Environmental and Biological Sensing: A review; doi:10.3390/s20072046; Published Apr. 5, 2020.

* cited by examiner

NANOMATERIAL PLASTIC OPTICAL FIBER FOR PIPELINE NERVE SYSTEM

FIELD OF THE DISCLOSURE

The present disclosure relates to remote monitoring of pipelines and in particular relates to plastic optical fibers (POFs) that are arranged as "optical nerves" in a pipeline system. The plastic optical fibers are coated with nanomaterials (NanoPOFs) which can function as both strain and gas sensors.

BACKGROUND OF THE DISCLOSURE

The oil and gas industry deploys vast amounts of pipeline infrastructure for fuel transport. Metallic pipelines are subject to corrosion due to the fuels transported, their material composition, and the environment in which the pipelines are placed or embedded. This is particularly true for underground pipes, for which soil conditions can lead to accelerated corrosion.

The corrosion problem is addressed to an extent by constructing the pipes using non-metallic materials. Although nonmetallic pipelines are generally not subject to corrosion, they experience other issues such as leakages and deformations. In addition, non-metallic often require more structural support compared to metallic pipes. Despite these challenges, non-metallic pipes are currently being deployed to avoid corrosion damage.

The widespread adoption of non-metallic pipelines has highlighted the lack of a reliable, safe, and accurate monitoring and inspection method for buried non-metallic pipelines and has made it difficult to determine the extent and location of leaks, deformations, and other types of structural defects in the pipelines. Known solutions for monitoring non-metallic pipes have proven ineffective because they can only detect structural changes at selective locations along a pipeline and therefore often miss damage and defects at other locations. What is therefore needed is system and method for monitoring of pipelines that can accurately detect and measure damages at all locations along a pipeline.

SUMMARY OF THE DISCLOSURE

In a first aspect the present disclosure describes a pipe segment for use in construction of a pipeline. The pipe segment includes a pipe body, a sensing nerve network that is embedded in or coupled to the pipe body and is configured to monitor a condition of the pipe segment in real-time. The sensing nerve network comprises plastic optical fiber (POF) nerves. The pipe segment further includes a nanomaterial coating covering a span of the plastic optical fiber nerves, the coating having an approximately constant diameter and the nanomaterial having a property that changes in the presence of a targeted gas, enabling detection of the targeted gas along the length of the optical fiber nerves.

In another aspect, the present disclosure describes a system for real-time monitoring of a pipeline that is made up of a series of connected pipe segments. The system includes a sensing nerve network that is associated with each pipe segment and is configured to monitor a condition of the pipeline in real-time, wherein the sensing nerve network comprises plastic optical fiber (POF) nerves. The system also includes a nanomaterial coating covering a span of the plastic optical fiber nerves, the coating having an approximately constant diameter and the nanomaterial having a property that changes in the presence of a targeted gas, enabling detection of the targeted gas along the length of the optical fiber nerves. A main controller is in communication with the sensing nerve network and configured for detecting the presence of the targeted gas and configured to communicate with operators.

These and other aspects, features, and advantages can be appreciated from the following description of certain embodiments and the accompanying drawing figures and claims.

DETAILED DESCRIPTION OF CERTAIN EMBODIMENTS OF THE DISCLOSURE

Figure 1:
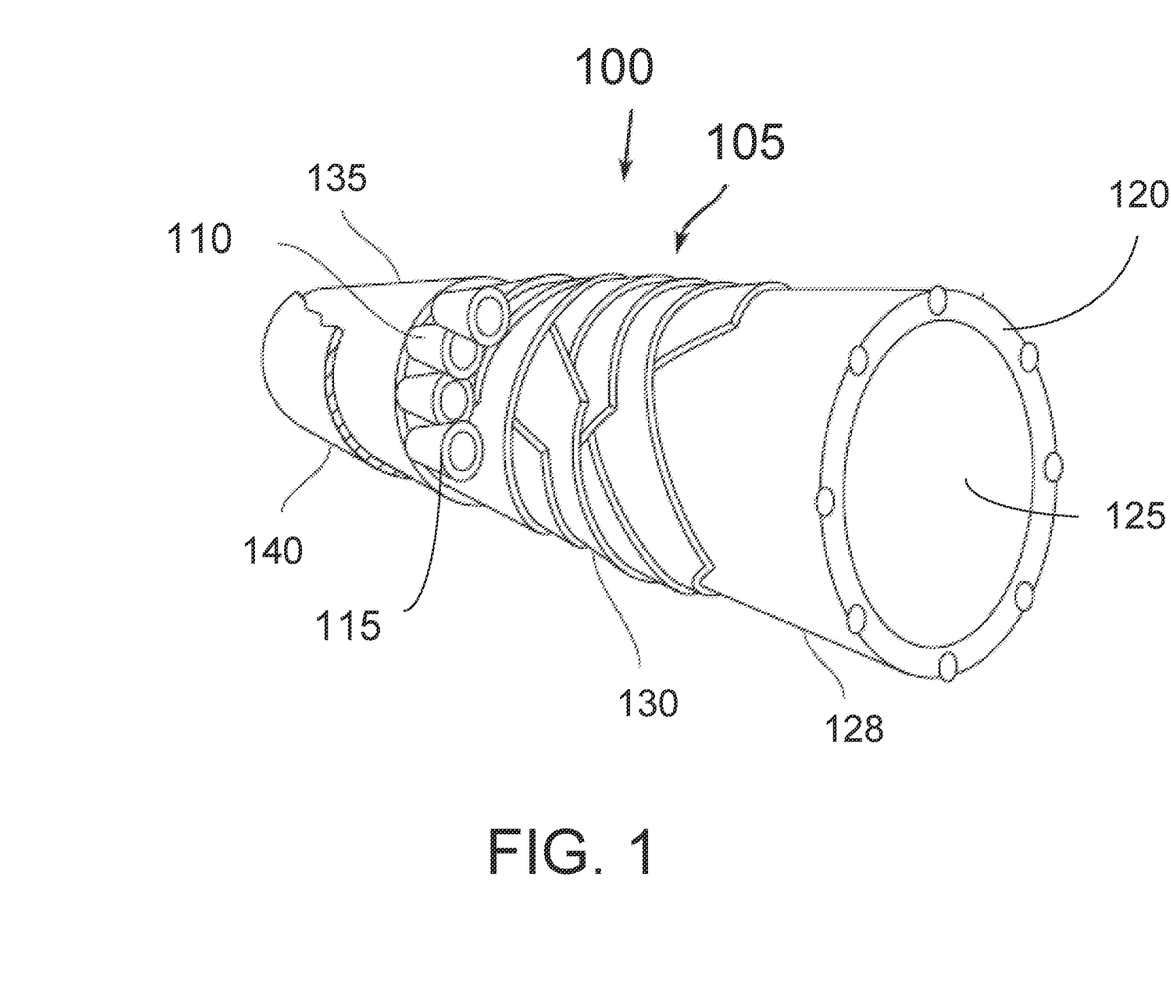
FIG. 1 is a schematic perspective view of a pipeline monitoring system according to an embodiment of the crawler according to the present disclosure.

The present disclosure provides a system and method for monitoring pipelines in which optical nerves, composed of nano-functionalized plastic optical fibers (NanoPOFs) are used to detect mechanical changes (strain, deformation) as well as gas concentration (leaks) along the length of a pipeline. A perspective view of a pipeline monitoring system, such as that disclosed in commonly owned and assigned U.S. patent application Ser. No. 17/653,216 entitled "Non-metallics Enhanced Reliability via Embedded Sensors (NERVES): Optical and Electrical Sensory Nerves" (filed on Mar. 2, 2022) is shown in FIG. 1. As is known, a pipeline 105 is made up of a series of pipe segments that are joined together to form a longer pipeline through which fluid (e.g., a hydrocarbon) flows from one location to another location. A pipeline 105 can be converted to a "smart pipeline" that is configured to monitor ongoing conditions and communicate with a main controller that is typically remotely located relative to the pipeline.

Such continuous real-time monitoring of the pipeline 105 ensures pipeline integrity, immediate leak detection, accurate leak location and risk mitigation, etc. By integral incorporation of a "sensing nerve" network along the pipeline 105 remote monitoring of a number of pipeline related measurements that are of importance in understanding the health of the pipeline becomes possible. As examples, the pipeline 105 can be monitored in real time using the sensing nerves to track any change in pressure, flow rate, temperature, as well as other operating parameters or external parameters.

Optical Nerve System for Pipelines

Figure 2:
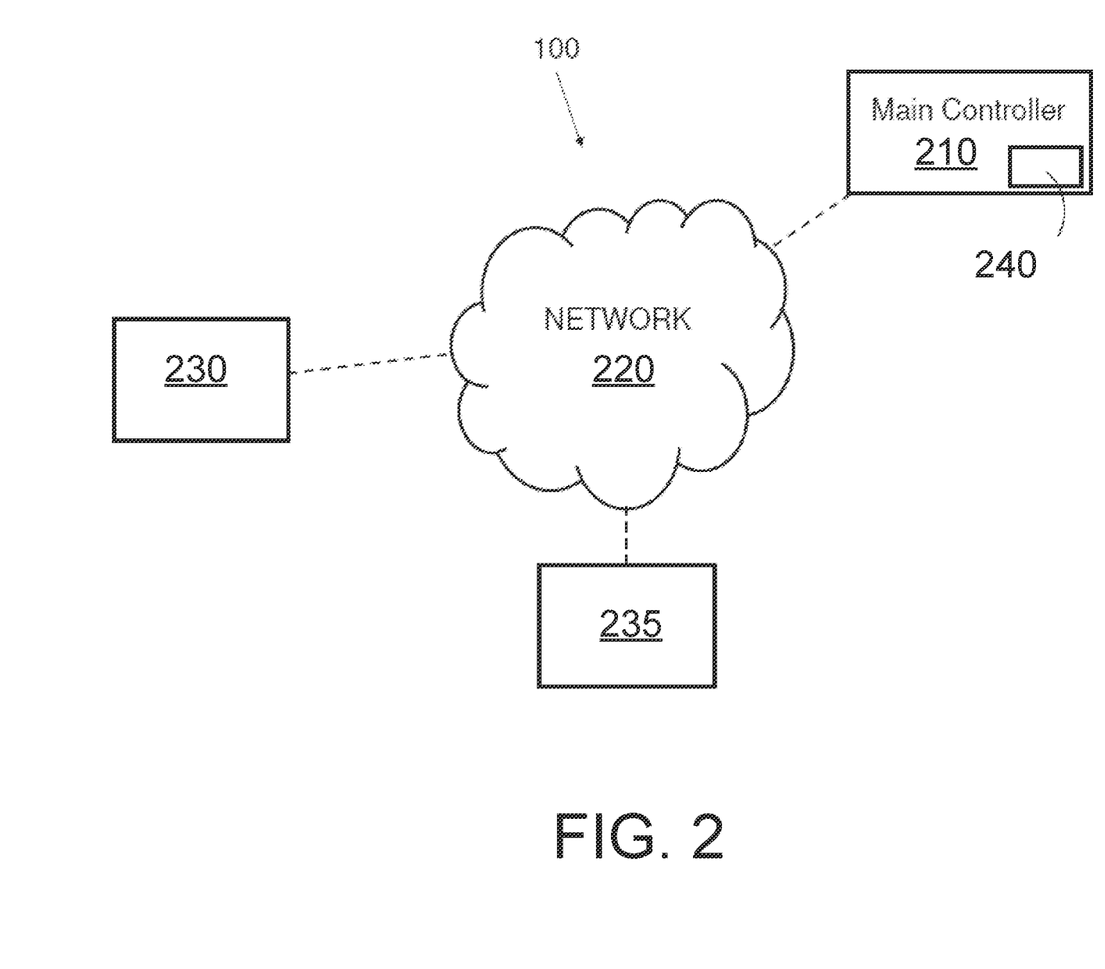
FIG. 2 is a schematic block diagram showing the pipeline monitoring system according to an embodiment of the present disclosure.

Turning now to a diagram of the general system view of FIG. 2, the pipeline monitoring system 100 is an automated system that includes a main controller (main processor) 210 that permits the user to control various aspects of the operation of the automated pipeline monitoring system 100. In one aspect, the pipeline monitoring system 100 can be of a type that communicates over a communications network 220 to allow the various components to speak with the main controller 210 and/or to communicate directly with one another. In addition, the main controller 210 serves to receive data (measurements) from the sensing nerve network, consisting of smart pipelines e.g., 230, 235 to alert the user as to any abnormalities detected from such received data (measurements). The main controller 210 is preferably located above ground at a desired location and communicates to other remote computing devices over the communications network 220.

Various forms of computing devices are accessible to the network 220 and can communicate over the network to the various devices that are configured to send and receive content, data, as well as instructions that, when executed, enable operation of the various connected components/mechanisms. The computing devices have processing capability, have or are coupled to memory resources, and can communicate over the network 220. For example, one or more computing devices can include mobile devices and server systems. In some embodiments, a computing device can be configured with a graphical user interface that can be provided to allow for remote control over the pipeline monitoring system. As is known, the GUI 240 is a system of interactive visual components for computer software. The GUI displays objects that convey information and represent actions that can be taken by the user and includes elements that allow user input to be registered. Through use of such computing devices, one or more operators can obtain real-time data and send real-time information or instructions as needed.

The main controller 210 can thus be a control unit that is located above the ground and acts as an interrogating and readout station that is data driven and wirelessly connected to operators via remote computing devices through IoT protocol. As is known, IoT communication protocols are modes of communication that protect and ensure optimum security to the data being exchanged between connected devices. The IoT devices are typically connected to the Internet via an IP (Internet Protocol) network. The evolution of IT has removed the dependency of processing data on a centralized server and instead replaces it with a more decentralized solution where each device can be considered a client as well as a server.

The sensing nerve network, e.g., 230, 235 comprises "smart" elements that are configured to provide real-time, continuous monitoring of the pipeline 105. Although two elements 230, 235 are shown, this is for ease of illustration and there can be any number of elements of the sensing nerve network. In the system shown, the elements are incorporated in a single pipeline, but the network can also include elements from a number of distinct pipelines. As described herein, the sensing nerve network 230, 235 is intimately associated with the pipeline either by integrally incorporating the sensing nerve network into the pipeline 105 at the time of manufacturing of the pipeline segments or the system of the sensing nerve network can be part of a retrofit solution in which the sensing nerve network is applied to the current installed pipes.

The sensing nerve network 230, 235 can be formed of one or more types of sensors and detectors and in one embodiment, the sensing nerve network 230, 235 is a hybrid network formed of at least two different types of sensing elements. The sensors and detectors are designed and implemented to detect failure and leaks along the pipeline 105, provide real-time monitoring and programs, monitor load and anomalous pressure, and permit the exact damage location along the pipeline 105 to be identified. The sensing elements that can be part of the sensing nerve network 230, 235 can be in the form of optical "nerves" that take the form of optical fibers that are incorporated into the pipes and extend along a length thereof. The optical fibers that can be incorporated constitute flexible, transparent fibers that are made by drawing glass (silica) or plastic to a diameter that is slightly thicker than that of a human hair. Optical fibers, such as the plastic optical fibers (POFs) disclosed herein, permit transmission of light longer distances and at higher bandwidths (data transfer rates) than electrical cable. With optical fibers, light travels down a fiber optic cable by bouncing off the walls of the cable repeatedly. Each light particle (photon) bounces down the pipe with continued internal mirror-like reflection as a light travels down the core of the cable. The optical fibers include distinct sections: a core section in the middle of the fiber and a cladding layer wrapped around the core. The optical fibers can carry light signals through the core in single or multiple modes. Light signals transmitted by the optical fiber can be received and decoded as data at a detector.

The POF sensors disclosed herein can be used to detect several different parameters. In some embodiments, the POF sensors can comprise Bragg gratings that can measure directional strain in multiple dimensions. When subject to displacement, the POF sensors can accordingly detect changes in the dimensions of the pipelines in which they are embedded. Such changes can be used in a computer model to reconstruct the two and three-dimensional shape of the pipeline. The POF sensors have the advantages of being relatively inexpensive, have high sensitivity, and signal mismatch arising from the fibers can be used to indicate locations at which changes in displacement occur.

Referring again to the pipeline segment shown in FIG. 1, the optical nerves e.g., 110, 115 are disposed circumferentially about the pipes of the pipeline 105. In general, the pipes forming the pipeline include an annular pipe body 120 that defines a central bore 125 through which fluid flows and the optical nerves 110. 115 are disposed within the annular pipe body. Similarly, the optical nerves 110, 115 are disposed in an outer radial direction relative to the bore 125. FIG. 1 shows one exemplary pipe segment that makes up the pipeline 105. The pipe body 120 can be constructed of concentric layers. An inner portion 128 surrounding the central bore 125 can be made of a reinforced thermoplastic pipe (RTP). As is known, RTP is a generic term that refers to a reliable high strength synthetic fiber, such as glass, aramid, or carbon. The next outer layer 130 can be formed using a reinforcing material, such as reinforcing steel, that surrounds the RTP. In certain embodiments, the optical nerves 110, 115 are disposed circumferentially about the reinforcing element as depicted. A further outer cover or shield layer 135 is provided and covers the optical nerves 110, 115. The outer shield 135 is made of a suitable corrosion resistant material. As described herein, the outer shield can be disposed over the optical nerves 110, 115 using any number of suitable techniques. For example, as mentioned herein, an additive manufacturing technique can be used. Alternatively, the outer shield can be formed over the nerves using other manufacturing techniques. For example, the nerves can be laid (wound) over the underling pipe segment structure and then the outer shield can be formed over the nerves. A further coating layer 140 is added over the outer shield 135.

Additive manufacture is one suitable technique for the fabrication of the pipeline with integrated, embedded sensing nerves. As is known, additive manufacturing (AM), also known as 3D printing, is a transformative approach to industrial production that enables the creation of lighter, stronger parts and systems. Additive manufacturing uses data computer-aided-design (CAD) software or 3D object scanners to direct hardware to deposit material, layer upon layer, in precise geometric shapes. As its name implies, additive manufacturing adds material to create an object. More specifically, the term "additive manufacturing" references technologies that grow three-dimensional objects one superfine layer at a time. Each successive layer bonds to the preceding layer of melted or partially melted material. Objects are digitally defined by computer-aided-design (CAD) software that is used to create .stl files that essentially "slice" the object into ultra-thin layers. This information guides the path of a nozzle or print head as it precisely deposits material upon the preceding layer. Alternatively, a laser or electron beam selectively melts or partially melts in a bed of powdered material. As materials cool or are cured, they fuse together to form a three-dimensional object. Accordingly, in one embodiment, additive manufacturing can be realized in the present application given the polymeric material nature of the nonmetallic pipes and the optical fibers (e.g., plastic optical fibers) and excellent printing compatibility.

The sensing nerve network can also be retrofitted to an existing (currently installed) pipeline. For existing pipelines, the sensing nerve network can be incorporated internally within the bore of the pipe segment by disposing the sensing elements on an inflatable jacket. The inflatable jacket is then inflated to insulate the pipe segment from the inside. The optical fibers can thus be located along the outer surface of the inflatable jacket with a longitudinal center bore defined therein. In one embodiment, the inflatable jacket can be in the form of an inflatable rubber jacket. The installed inflated rubber jacket thus defines the inner bore through which the fluid flows with the sensing elements being located between the inflatable jacket and the inner surface of the pipe segment itself. The sensing elements are in this manner disposed between the inflatable jacket and the pipe segment.

In this retrofit design, it will be appreciated that external connections around the far ends of the pipe segments are required in order to operatively connect the sensing nerve network of each pipe segment. In other words, the connectors can be of a type that establish a daisy chain type connection between the pipe segments to allow the sensing nerves of the discrete pipe segments to be operatively connected to one another to form a smart pipeline that is operatively connected to the main controller (monitoring unit) that is located above ground. Once inserted, the inflatable jacket can be inflated to secure it in the pipe and define the center bore through which oil flows.

The optical nerves e.g., 110, 115 are preferably evenly distributed and cover the circumference of the pipe segment to increase the detection probability as a function of location. This provides a certain amount of redundancy. The optical nerves typically extend axially along the longitudinal dimension of the pipe. However, the optical nerves can also be embedded in a latitudinal "hoop" direction or helically as a spiral along the pipeline.

With respect to fiber Bragg grating sensors (FBGs), these types of sensors can be used in deformation measurement of large structures due to their small size, light weight, their imperviousness to electromagnetic interference and self-tuning function. FBGs use wavelength coding, which is only slightly affected by the fluctuation of the system light source and external factors. It is suitable for online measurement of stress, strain and temperature outside or inside the structure in a complex environment. As such, it can be implemented in a pipeline environment as discussed herein. While traditional fiber optic sensors are designed to only transmit signals, the optical nerves both sense (measure) parameters and transmit signals that correspond to the measured parameters. The working principle of an FBG sensor utilizes the fact that changes in the physical environment around the FBG sensor such as stress, strain and temperature have a corresponding effect on the periodicity of the grating and/or the refractive index of the fiber material. With excellent signal-to-noise ratio and very low signal degradation over long distances, these types of sensors enable precise measurements of parameters such as temperature, strain, vibration, pressure, etc. More specifically, optic nerve sensors are capable of measuring the following general parameters: temperature; pressure; liquid level; strain; vibration; displacement; tilt; and load. In addition, plastic optical fiber sensors can be configured to detect for the presence of one or more analytes as described further below.

It will also be appreciated that a basic fiber optic sensor generally consists of a number of components aside from the optical fiber itself. In one embodiment, the fiber optic sensor includes an optical source (e.g., LED, laser, etc.), the optical fiber, a sensing element, optical detector and end processing devices (e.g., optical-spectrum analyzer, oscilloscope, etc.). The optical fiber sensors are generally divided into two categories: thru-beam and reflective. The thru-beam type comprises a transmitter and a receiver. The reflective type, which is a single unit, is available in three types: parallel, coaxial, and separate. The three types are based on the shape of the cross-section of the optical fiber. One type is a coaxial which is a high-precision type, consisting of a core (transmitter) and surrounding area (receiver). These principles can be implemented in the present system.

Various adverse conditions such as leaks, ground movement and changes in structural health can be detected by the optical nerves and associated detection system. All of these conditions typically result in detectable displacements, pressures, vibrations, and/or temperature changes that can be measured by the optical nerves.

The software and operating systems associated with the sensing nerve network are configured to provide alarms or notifications to operators when a condition falls outside of a normal operating range. Numerous algorithms can be provided for detecting even small leaks and local events based on the measured data provided by the sensing nerve network. The alerts can be in the form of visual alerts on the screen and/or auditory alerts and present information such as the location of the event to allow the operator to dispatch personnel to that location or otherwise conduct additional investigation.

Nanomaterial Plastic Optical Fiber (NanoPOFs)

Embodiments of the optical nerve system employ nanomaterials-based Plastic Optical Fibers (POFs), referred to as "NanoPOFs". NanoPOFs can form Bragg grating sensor or gas sensors. The NanoPOFs comprise optical fibers that are coated with a nanomaterial, i.e., a material composed of nanoparticle-sized structures. The chemical composition of the nanomaterials can vary widely, but some particularly applicable examples include, but are not limited to, carbon nanotubes, quantum dots, silver nanoparticles and graphene. POFs for gas sensors can be developed using a coating technique that forms a layer of nanomaterials that is sensitive to a particular target gas. Sensitive nanolayers that have shown high sensitivity include (but are not limited to) carbon nanotubes, titanium dioxide nanotubes, graphene, nanocrystalline diamond, and a range of metal oxide nanomaterials. These NanoPOFs improve detection of mechanical strain deformation and gas leakage sensing. It is noted that a single NanoPOF sensor can be formed to perform both mechanical strain and gas detection.

Figure 3:
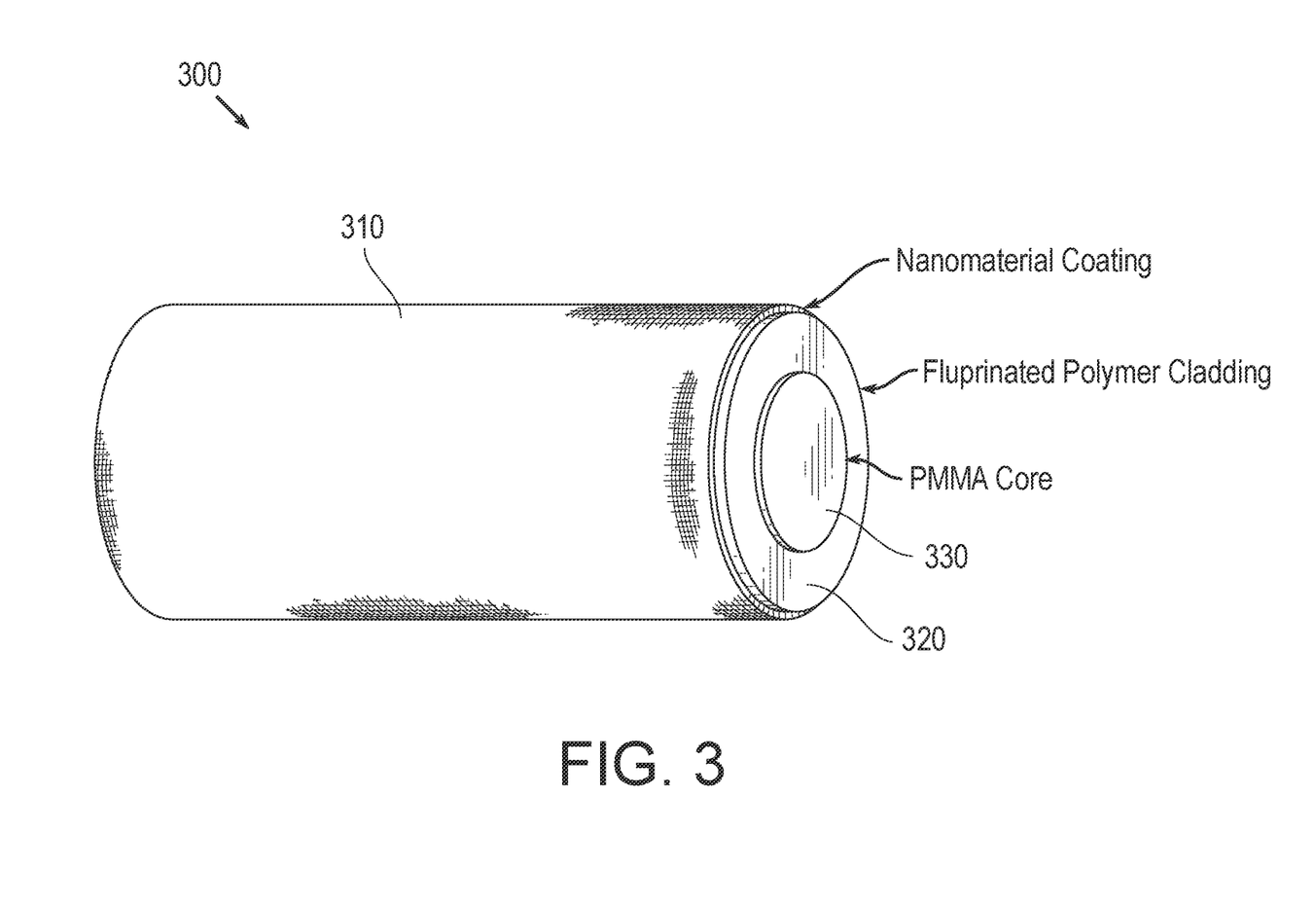
FIG. 3 is a schematic perspective view of a plastic optical fiber with nanomaterial coating according to an embodiment of the present disclosure.

FIG. 3 is a schematic perspective view of a NanoPOF according to an embodiment of the present disclosure. The NanoPOF 300 is generally cylindrical and extends longitudinally in the direction of the central axis of the cylindrical body. The circumference of the NanoPOF comprises a coating 310 that is formed using a nanomaterial, or a plurality of nanomaterials. Beneath the coating 310 is a fluorinated polymer cladding layer 320 which surrounds a central core 330. In some embodiments, the core 330 is made using polymethyl methacrylate (PMMA), but other polymeric materials can also be used. In contrast to other types of fiber sensors that have been proposed, the nanomaterial coating covers the entire length of the fiber and the diameter of the segment (i.e., the diameter at the surface of the fiber upon which the coating is deposited) is approximately constant along the segment. "Approximately" in this case means that the diameter does not vary greater than +/−3 percent from an average value. There may be small perturbations in the diameter, but they are minor and do not affect the sensing functions of the NanoPOFs. The "entire length" of the fiber segment is intended to mean a span of at least 10 centimeters in length but can extend for the entire length of the fiber which can be orders of magnitude larger.

POF sensors that are known in the art tend either employ modified fiber shapes, such as D-shaped and U-shaped bends or replace part of the cladding and/or core of the fiber with the nanomaterials. In both of these cases, the active nanomaterial coating occupies only a restricted region of the fiber. In contrast, the NanoPOF of the present disclosure does not have a modified shape or area and does not rely upon replacing part of the fiber cladding or core and extends the active nanomaterial over the entire length of the fiber. The known POF sensors are not appropriate for environmental safety applications, as in such devices detection only occurs in the vicinity of the modified area and not along the entire length of the fiber. In contrast, the NanoPOF sensors described herein do not suffer from this drawback since the analyte-sensitive coating covers the entire length of the fiber.

Undedicated toxic gases can cause appreciable damage and thus the NanoPOF gas sensors having sufficient higher sensitivity, selectivity, and stability can be used to ensure environmental and health safety. Recent investigations have shown that nanomaterials have such high sensitivity to specific analytes that that can provide such high performance. Such sensors detect gas when the surface of the nanomaterials absorbs gas (analyte) molecules causing a change in the local optical properties of the underlying plastic optical fiber. In some hybrid embodiments, the sensing nerves in the pipeline include electrical lines or cables, such as coaxial transmission cables. In these embodiments, the nanomaterials undergo a change in one or more electrical or electrochemical properties such as, but not limited to, resistivity, conductivity, capacitance as well as semiconductive properties can be used for detection. Different nanomaterials can be selected for incorporated in a NanoPOF depending on the target gas sought to be detected since different materials have sensitivity to different gases based, for example, on surface energy and quantum size effects. The performance of the NanoPOF sensor can also be enhanced by increasing the surface area of the nanomaterials to lower the limit of detection.

NanoPOFs for gas sensors can be produced using various coating techniques for forming the top nanoparticle layer. Coating techniques for preparing the coating can include sputtering and fabrication techniques such as vapor deposition, spin-coating, and laser pulse depositing. In addition, the coatings can be produced using 3D fabrication techniques. As noted, the coated nanoparticle layer can include carbon nanotubes, titanium dioxide nanotubes, graphene, nanocrystalline diamond, quantum dots and a range of metal oxide nanomaterials along the length of the fiber. These materials help in tuning the characteristics of the sensor by adding selected properties such as surface roughness and mesoporosity. These characteristics enhance the functionality of the device and lead to higher sensitivity, accuracy and faster response time.

It is found that certain fabrication techniques are particularly suited for selected coating compositions. Examples of coating compositions with their associated coating techniques that can be used to produce certain gas-sensitive coatings of a NanoPOF according to the present disclosure include (but are not limited to): liquid phase deposition of MPyP/$TiO_2$ (nanoparticles based on a metallorganic complex with molybdenum and porphyrin) for detection of ammonia; pulsed laser deposition for copper (II) oxide (CuO) and zinc oxide (ZnO) nanostructures for detection of hydrogen sulfide ($H_2S$) and ammonia, respectively; and co-precipitation of Tin (IV) Oxide ($SnO_2$) and copper (II) oxide for detection of ethanol gas.

As noted above, although nonmetallic pipelines eliminate the possibility of corrosion, leakages and deformations are still a challenge, and often require more support than metallic pipes. The NanoPOF sensors for the optical nerve system described herein provide a reliable, safe and accurate monitoring and inspections system for buried pipelines and are particularly useful in nonmetallic pipelines. The disclosed system has an important advantage in terms of large areas of application and sensitivity range because the sensitive coating of the covers the entire fiber fabric and can have wider sensitivity range. The system and method of embedding optical nerves in pipelines equipped with NanoPOFs is non-destructive, cost effective, precise, safe, and can be applied to different types of pipelines.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A pipe segment for use in construction of a pipeline, comprising:
    a pipe body;
    a sensing nerve network that is embedded in or coupled to the pipe body and is configured to monitor a condition of the pipe segment in real-time, wherein the sensing nerve network comprises plastic optical fiber (POF) nerves; and
    a nanomaterial coating covering a cladding over a span of the plastic optical fiber nerves, the coating having an approximately constant diameter and the nanomaterial having a property that changes in the presence of a targeted gas, enabling detection of the targeted gas along the length of the optical fiber nerves.

2. The pipe segment of claim 1, wherein the optical fiber nerves of the pipe segment include Bragg gratings for detection of changes in displacement and strain.

3. The pipe segment of claim 1, wherein the pipe body comprises a non-metallic hollow pipe body that includes outer layers that surround the pipe body for reinforcement.

4. The pipe segment of claim 3, wherein the sensing nerve network is disposed in the outer layers that reinforce the pipe body.

5. The pipe segment of claim 1, wherein the sensing nerve network further comprises electrically conductive lines that extend along the pipe with the optical fiber nerves.

6. The pipe segment of claim 1, wherein the sensing nerve network comprises elements that are wound in a helical direction about an outer surface of the pipe body.

7. The pipe segment of claim 1, wherein the sensing nerve network is configured for real-time monitoring and measurement of measurement of stress, strain, pressure, liquid level, vibration, displacement, tilt, temperature, and a concentration of at least one targeted gas of the pipe body and surrounding environment.

8. The pipe segment of claim 1, wherein the nanomaterial is selected from the group of: carbon nanotubes, titanium dioxide nanotubes, graphene, nanocrystalline diamond, quantum dots and a metal oxide nanomaterial.

9. The pipe segment of claim 8, wherein the nanomaterial includes copper (II) oxide that is sensitive to the presence of hydrogen sulfide ($H_2S$).

10. The pipe segment of claim 8, wherein the nanomaterial includes Tin (IV) Oxide ($SnO_2$) and copper (II) oxide which combination is sensitive to the presence of ethanol gas.

11. The pipe segment of claim 1, wherein the nanomaterial includes molybdenum that is sensitive to the presence of ammonia.

12. A system for real-time monitoring of a pipeline that is made up of a series of connected pipe segments, the system comprising:
    a sensing nerve network that is associated with each pipe segment and is configured to monitor a condition of the pipeline in real-time, wherein the sensing nerve network comprises plastic optical fiber (POF) nerves;
    a nanomaterial coating covering a cladding over a span of the plastic optical fiber nerves, the coating having an approximately constant diameter and the nanomaterial having a property that changes in the presence of a targeted gas, enabling detection of the targeted gas along the length of the optical fiber nerves; and
    a main controller that is in communication with the sensing nerve network and configured for detecting the presence of the targeted gas.

13. The system of claim 12, wherein the sensing nerve network is embedded within the pipe segments.

14. The system of claim 12, wherein the main controller is configured to detect a location at which the presence of the targeted is detected.

15. The system of claim 12, wherein the main controller executes Wavelength Division Multiplexing (WDM) technology to map optical signals to physical locations along the optical nerve.

16. The system of claim 12, wherein the optical fiber nerves include Bragg gratings and the main controller is able to detect movement and strain using data received from the sensing nerve network.

17. The system of claim 12, wherein the nanomaterial is selected from the group of: carbon nanotubes, titanium dioxide nanotubes, graphene, nanocrystalline diamond, quantum dots and a metal oxide nanomaterial.

18. The system of claim 17, wherein the nanomaterial includes copper (II) oxide that is sensitive to the presence of hydrogen sulfide ($H_2S$).

19. The system of claim 17, wherein the nanomaterial includes Tin (IV) Oxide ($SnO_2$) and copper (II) oxide which combination is sensitive to the presence of ethanol gas.

20. The system of claim 12, wherein the nanomaterial includes molybdenum that is sensitive to the presence of ammonia.

* * * * *